United States Patent
Bono et al.

(10) Patent No.: US 10,037,369 B1
(45) Date of Patent: Jul. 31, 2018

(54) STORAGE TIERING IN REPLICATION TARGET BASED ON LOGICAL EXTENTS

(71) Applicant: EMC IP Holding Company LLC, Hopkinton, MA (US)

(72) Inventors: Jean-Pierre Bono, Westborough, MA (US); Dennis Duprey, Raleigh, NC (US); Xiangping Chen, Sherborn, MA (US); Karl M. Owen, Chapel Hill, NC (US); Miles A de Forest, Bahama, NC (US); Himabindu Tummala, South Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 452 days.

(21) Appl. No.: 14/752,616

(22) Filed: Jun. 26, 2015

(51) Int. Cl.
  *G06F 17/00* (2006.01)
  *G06F 17/30* (2006.01)

(52) U.S. Cl.
  CPC .... *G06F 17/30575* (2013.01); *G06F 17/3012* (2013.01)

(58) Field of Classification Search
  CPC ................................................ G06F 17/30575
  See application file for complete search history.

(56) References Cited

U.S. PATENT DOCUMENTS

| | | | | |
|---|---|---|---|---|
| 8,285,758 B1 * | 10/2012 | Bono | ................ | G06F 17/30079 707/822 |
| 9,082,512 B1 * | 7/2015 | Davis | ................ | G06F 17/30194 |
| 9,171,020 B2 * | 10/2015 | Faerber | ............. | G06F 17/30315 |
| 9,778,856 B2 * | 10/2017 | Fan | ........................ | G06F 3/0613 |
| 2005/0270856 A1 * | 12/2005 | Earhart | ................... | G11B 27/11 365/189.05 |
| 2007/0260842 A1 * | 11/2007 | Faibish | ................... | G06F 3/061 711/170 |
| 2008/0005468 A1 * | 1/2008 | Faibish | ................. | G06F 3/0622 711/114 |
| 2008/0189343 A1 * | 8/2008 | Hyer | ..................... | G06F 3/0614 |
| 2012/0272030 A1 * | 10/2012 | Jennas, II | ............ | G06F 3/0611 711/165 |
| 2013/0073519 A1 * | 3/2013 | Lewis | .............. | G06F 17/30215 707/610 |
| 2013/0238575 A1 * | 9/2013 | Amarendran | ..... | G06F 17/30289 707/694 |
| 2014/0068224 A1 * | 3/2014 | Fan | ........................ | G06F 3/0613 711/206 |
| 2016/0004721 A1 * | 1/2016 | Iyer | ................... | G06F 17/30212 707/649 |
| 2016/0191250 A1 * | 6/2016 | Bestler | .................... | G06F 3/067 713/168 |

* cited by examiner

Primary Examiner — Hung Le
(74) Attorney, Agent, or Firm — BainwoodHuang

(57) ABSTRACT

A technique for replicating a file from a source data storage system (source) to a destination data storage system (destination) includes receiving, by the destination from the source, (i) file data for multiple logical extents of the file and (ii) respective tiering metadata for those logical extents. The destination selects, based on the tiering metadata, one or more storage tiers available on the destination. The destination updates a local replica of the file by placing the logical extents on the selected tier or tiers.

18 Claims, 8 Drawing Sheets

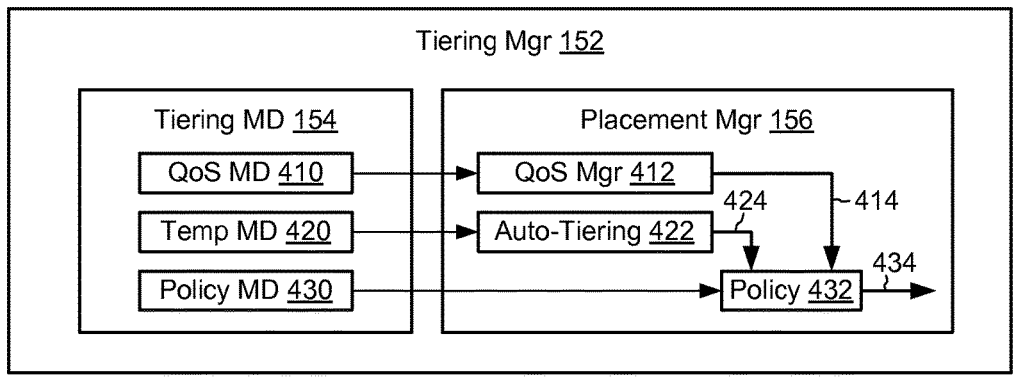
*FIG. 4*
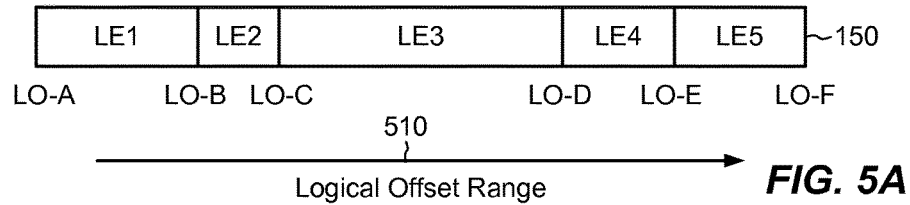
*FIG. 5A*
*FIG. 5B*

STORAGE TIERING IN REPLICATION TARGET BASED ON LOGICAL EXTENTS

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example.

Data storage systems commonly employ replication technologies for protecting the data they store. Conventional replication technologies include those providing continuous replication and those providing snapshot shipping. Well-known continuous replication solutions include Recover-Point and MirrorView systems, which are available from EMC Corporation of Hopkinton, Mass. RecoverPoint systems include a replication splitter and one or more local replication appliances provided both on a source data storage system (source) and on a destination data storage system (destination). As the source processes IO requests specifying data to be written to a particular LUN (Logical Unit Number), the replication splitter on the source intercepts the IO requests and sends them to a local replication appliance (or appliances). The local replication appliance communicates with a replication appliance at the destination, and the two appliances orchestrate storage of the data specified in the IO requests at the destination. In this manner, the destination is made to store a redundant copy of the data of the LUN stored at the source, and the redundant copy at the destination may provide a means for recovering the contents of the LUN in the event of a failure at the source. MirrorView systems perform similar functions to those described for Recover-Point, but communicate directly between a source and a destination with no intervening replication appliances.

A well-known snapshot-shipping replication solution is the Celerra Replicator™ V2, also available from EMC Corporation of Hopkinton, Mass. Replicator V2 operates by taking snaps (i.e., point-in-time copies) of files and file systems at a source, identifying differences between current snaps and previous snaps, and sending the differences to a destination. The destination receives the differences and applies them to replicas maintained at the destination, to update the replicas with changes made at the source.

SUMMARY

Data storage systems often employ storage tiering to improve performance. As is known, "storage tiering" provides a way of segregating different types of data across storage media that provide different qualities of service. For example, a system may store frequently-accessed metadata on a high tier of storage, such as on high-speed electronic flash drives, but may store infrequently accessed file data on a low tier of storage, such as on slower magnetic disk drives. A data storage system may include any number of storage tiers that provide different performance levels across any number of performance characteristics.

Unfortunately, the above-described replication approaches do not account for storage tiering decisions when replicating files from a source data storage system (source) to a destination data storage system (destination). Thus, efforts to segregate data across different storage tiers at the source do not translate to similar segregation at the destination. For instance, the source may place certain critical data on high-speed flash, while the destination may place the same data on slower magnetic disk drives, even though the destination may have plenty of high-speed flash available. In such an arrangement, when a failure at the source results in failover from the source to the destination, the destination will not be able to provide the same quality of service as was provided at the source. Users will thus experience an undesirable reduction in quality of service.

In addition, storage tiering technologies often operate at course granularity based on large physical extents. These physical extents correspond to ranges of physical addresses supporting a file system in which files may be stored. In general, however, these physical extents are poorly correlated with logical extents within particular files in the file system. Replication technologies often operate at the level of logical extents, e.g., by identifying file data by logical offset into a file. Performing storage tiering in the context of replication can thus be complex in systems where storage tiering is based on physical extents.

In contrast with prior replication approaches, an improved technique for replicating a file from a source data storage system (source) to a destination data storage system (destination) includes receiving, by the destination from the source, (i) file data for multiple logical extents of the file and (ii) respective tiering metadata for those logical extents. The destination selects, based on the tiering metadata received, one or more storage tiers available on the destination. The destination updates a local replica of the file by placing the logical extents on the selected tier or tiers.

Advantageously, the improved technique performs storage tiering on a per-logical-extent basis, with each logical extent providing data of the file over a respective range of logical offsets into the file. Performing storage tiering based on logical extent, rather than based on physical extent, promotes fine granularity in storage tiering as well as replication efficiency. Also, performing storage tiering on the destination, based on tiering metadata from the source, enables the possibility that the destination may place logical extents on different storage tiers from those on which the same extents are placed at the source, such as to reflect differences in configuration between source and destination.

Certain embodiments are directed to a method of performing storage tiering in a destination data storage system. The destination data storage system has multiple storage tiers configured to store replicated data received from a source data storage system. The method includes receiving, by the destination data storage system, replication updates from the source data storage system. The replication updates provide file data at each of a set of logical extents of a file on the source data storage system and identify, for each of the set of logical extents, a respective range of logical offsets of that logical extent into the file on the source data storage system. The method further includes receiving, by the destination data storage system, tiering metadata. The tiering metadata (i) is generated by the source data storage system for performing storage tiering of the file on the source data storage system and (ii) includes a respective portion of tiering metadata for each of the set of logical extents. The method still further includes updating a replica of the file on the destination data storage system, including, for each of the set of logical extents, (i) selecting, based on the portion of tiering metadata for that logical extent, a storage tier in the destination data storage system for the file data provided in that logical extent and (ii) placing the file data provided in that logical extent in the selected storage tier.

Other embodiments are directed to a destination data storage system constructed and arranged to perform a method of performing storage tiering in a destination data storage system, such as the method described above. Still other embodiments are directed to a computer program product. The computer program product stores instructions which, when executed on control circuitry of a destination data storage system, cause the destination data storage system to perform a method of performing storage tiering in a destination data storage system, such as the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

FIG. 4 is a block diagram of an example tiering manager of FIG. 1 in addition detail;

FIGS. 5A and 5B block diagrams that show example multiple logical extents of an object-file (FIG. 5A) and example tiering metadata relating multiple logical extents of a file to respective QoS (Quality of Service) metadata, data temperature metadata, and policy metadata (FIG. 5B);

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for replicating a file from a source data storage system (source) to a destination data storage system (destination) includes receiving, by the destination from the source, (i) file data for multiple logical extents of the file and (ii) respective tiering metadata for those logical extents. The destination selects, based on the tiering metadata, one or more storage tiers available on the destination. The destination updates a local replica of the file by placing the logical extents on the selected tier or tiers.

Figure 1:
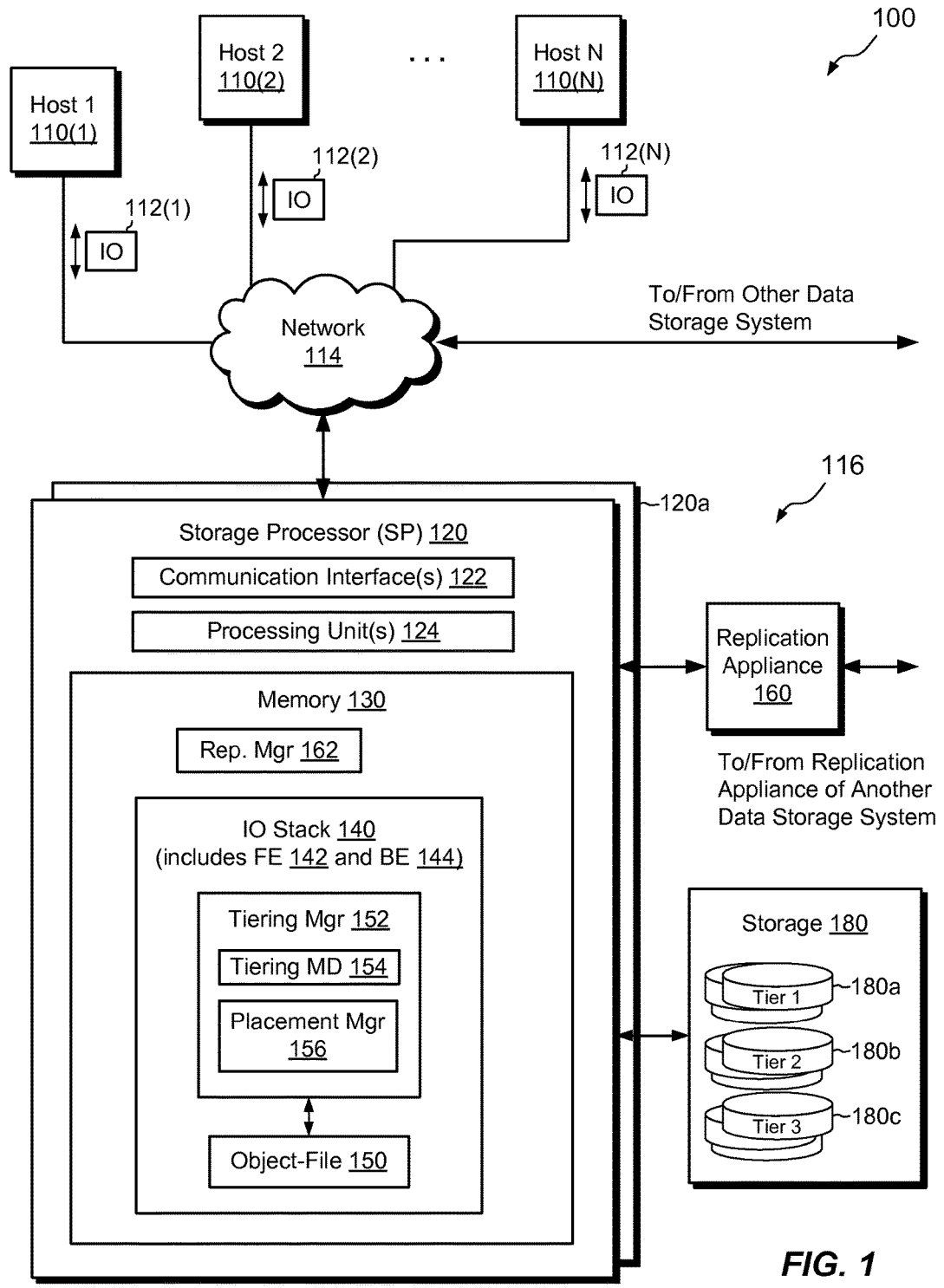
FIG. 1 is a block diagram showing an example environment in which improved techniques hereof can be practiced.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The storage 180 includes, for example, multiple tiers of storage, including Tier 1 storage 180a, Tier 2 storage 180b, and Tier 3 storage 180c. In an example, Tier 1 storage 180a includes high-speed electronic flash drives, Tier 2 storage 180b includes slower electronic flash drives, and Tier 3 storage 180c includes magnetic disk drives. Any number of storage tiers may be provided. The data storage system 116 may include multiple SPs like the SP 120 (e.g., a second SP, 120a). For example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs, including a single SP, may be provided and the SP 120 can be any type of computing device capable of processing host IOs.

Although FIG. 1 shows only a single data storage system 116, it is understood that many operations described herein involve activities that take place between two data storage systems, i.e., between a source data storage system (source) and a destination data storage system (destination). The source and destination may be connected via the network 114 or via any suitable means. The particular construction shown for the data storage system 116 is intended to be representative of both the source and the destination, although it should be understood that the source and the destination may vary in their particular details.

The network 114 can be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. In an example, the SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein, e.g., alone or in coordination with similar control circuitry on another data storage system. Also, the memory 130 includes a variety of software constructs realized in the form of executable instructions. When the executable instructions are run by the set of processing units 124, the set of processing units 124 are caused to carry out the operations defined by the software constructs. Although certain software constructs are specifically shown and described, it is understood that the memory 130 typically includes many other software constructs, which are not shown, such as an operating system, various applications, processes, and daemons.

The memory 130 is seen to include an IO stack 140 and a replication manager 162. The IO stack 140 provides an execution path for host IOs (e.g., IO requests 112(1-N)). In some examples, the IO stack 140 is provided in the form of a separate front end (FE) 142 and back end (BE) 144. The back end 144 may be provided locally on the SP 120, as shown. Alternatively, the back end 144 may be located on another SP (e.g., on SP 120a) or in a block-based array connected to the SP 120 (e.g., in a gateway configuration).

The replication manager 162 controls the establishment of replication settings on particular data objects. The data objects may include any of LUNs, file systems, and/or VVols (virtual volumes, e.g., as available from VMware, Inc. of Palo Alto, Calif.), for example. The replication manager 162 establishes replication settings on a per-data-object basis, conducts replication sessions, and orchestrates replication activities, including recovery and failover. As will be described infra, the data storage system 116 internally realizes the data objects as respective object-files in one or more internal file systems.

In some examples, the replication manager 162 works in coordination with a replication appliance 160. The replication appliance 160 assists in performing continuous replication with another data storage system (e.g., with a destination data storage system), which may be located remotely. In some examples, the replication appliance 160 takes the form of a separate hardware unit. Any number of such hardware units may be provided, and the hardware units may work together, e.g., in a cluster.

The IO stack 140 is seen to include an object file 150 and a tiering manager 152. The object-file 150 is a file served from within an internal file system of the data storage system 116, which file provides a file-based realization of a data object, such as a LUN, host file system, or VVol, for example. The tiering manager 152 includes tiering metadata 154 and a placement manager 156. The placement manager 156 directs the IO stack 140 to store data of the object-file 150 in the storage tiers 180a through 180c in accordance with the tiering metadata 154. In some examples, the tiering metadata 154 is provided in portions of tiering metadata on a per-logical-extent basis, where a portion of tiering metadata for a logical extent provides tiering metadata specific to that logical extent and where each logical extent describes file data of the object-file 150 within a specified range of logical offsets into the object-file 150. As will be described, the portion of tiering metadata 154 for each logical extent of the object-file 150 may include data temperature metadata, QoS (Quality of Service) metadata, and/or tiering policy metadata, for example. When the data storage system 116 acts as a source for replicating the object-file 150, the data storage system 116 generates the tiering metadata 154, for example, using a process that includes auto-tiering (e.g., based on data temperature), rules-based analysis (e.g., based on QoS), and/or user input. When the data storage system 116 acts as a destination for maintaining a replica of the object-file 150, the destination generally does not create its own tiering metadata. Rather, the data storage system uses the tiering metadata 154 received from the source to independently perform storing tiering at the destination.

In example operation, the hosts 110(1-N) issue IO requests 112(1-N) to the data storage system 116. The IO requests 112(1-N) are directed to the data object realized in the object-file 150, which may be a LUN, host file system, or VVol, for example. The SP 120 receives the IO requests 112(1-N) at the communication interfaces 122 and passes the IO requests to the IO stack 140 for further processing. At the front end 142, processing includes mapping the IO requests 112(1-N) to internal, block-based requests. As will be described, the front end 142 expresses the object-file 150 as an internal volume, e.g., via direct mapping or mapping through the object-file's inode structure, and directs the internal, block-based requests to this internal volume. The IO stack 140 thus converts incoming host IO requests into requests to the internal volume, which the IO stack 140 maps to the object-file 150. As will be described, the front end 142 may perform continuous replication on the object-file 150 at the level of this internal volume, e.g., by mirroring internal, block-based requests for data writes to a destination system. In addition, the front end 142 may perform snapshot-shipping replication at the level of the object file 150, e.g., by taking snaps of the file, computing differences between snaps, and sending the differences to the destination system.

When performing data writes to the object-file 150, the placement manager 156 applies the tiering metadata 154 to select storage tiers on which to place newly arriving data. After processing by the front end 142, the IO requests propagate to the back end 144, and the back end 144 executes commands for writing the physical storage 180, in accordance with the storage tiering specified in the tiering metadata 154.

Additional information about storage tiering may be found in copending U.S. patent application Ser. No. 13/928,591, filed Jun. 27, 2013. Additional information about replication and IO stack mapping may be found in copending U.S. patent application Ser. No. 13/828,294, filed Mar. 14, 2013. The contents and teachings of both of these prior applications are incorporated by reference herein in their entirety.

During replication, with the data storage system 116 acting as a source, the data storage system 116 sends logical extents of the object file 150 to the destination. In an example, the logical extents represent recent changes made at the source to the object-file 150, e.g., in response to recent IO requests 112(1-N). Contemporaneously, or at any time relative to sending the logical extents, the data storage system 116 also sends the tiering metadata 154. The destination receives the logical extents and the tiering metadata 154 and operates its own placement manager 156 to place the received logical extents in a replica of the object-file 150 in accordance with the received tiering metadata 154. The destination thus performs storage tiering on replicated logical extents using the same tiering metadata 154 that the source used for performing storage tiering of the same logical extents at the source. Any data temperature metadata, QoS metadata, policy metadata, and so on, used to perform storage tiering of logical extents at the source is also used to perform storage tiering of those logical extents at the destination.

Figure 2:
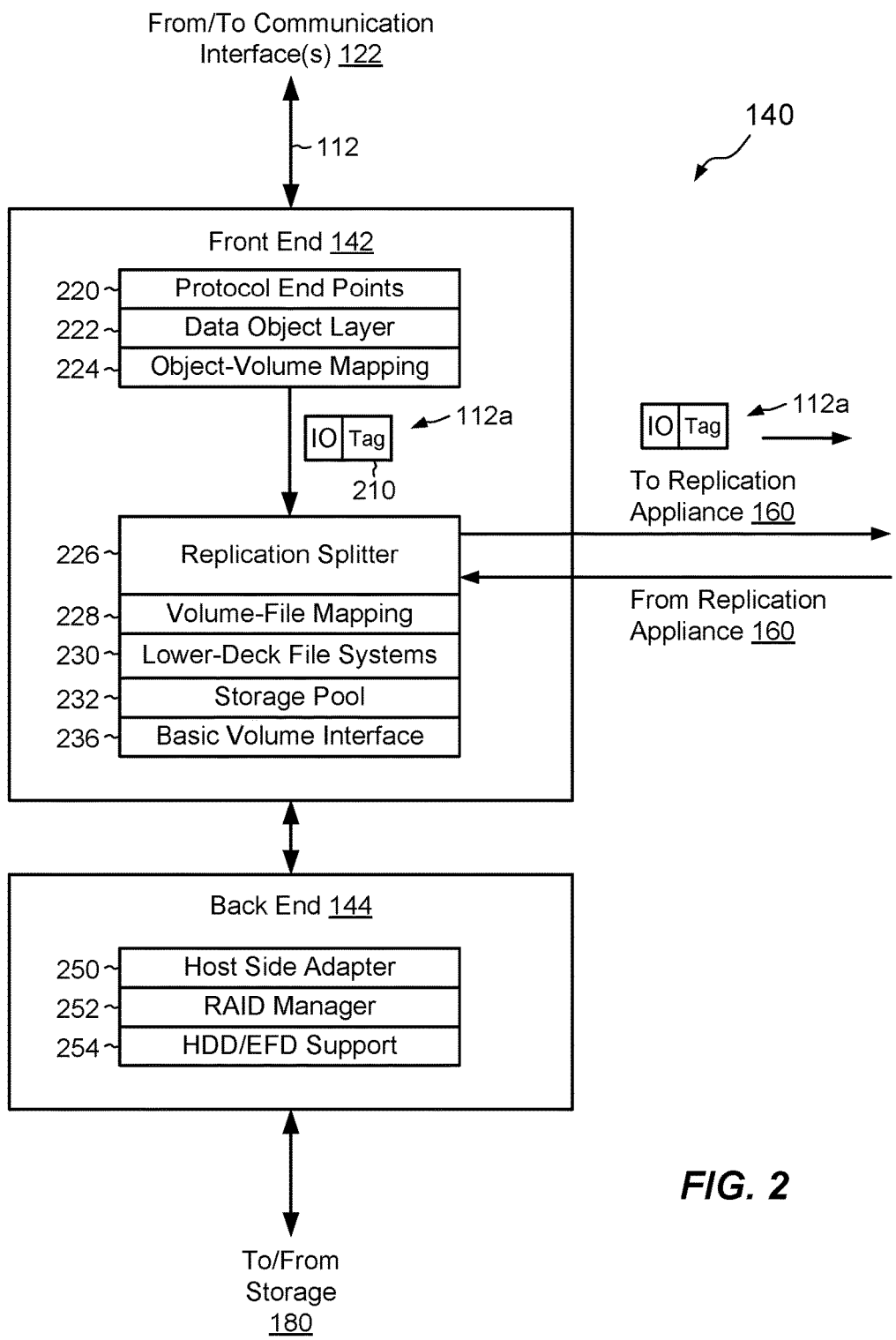
FIG. 2 is a block diagram showing an example IO stack of a storage processor of FIG. 1 in additional detail.

FIG. 2 shows the IO stack 140 in additional detail. Here, the front end 142 is seen to include protocol end points 220, a data object layer 222, an object-volume mapping layer 224, a replication splitter 226, a volume-file mapping 228, lower-deck (internal) file systems 230, a storage pool 232, and a basic volume interface 236. The back end 144 is seen to include a host side adapter 250, a RAID (Redundant Array of Independent Disks) manager 252, and hard disk drive/electronic flash drive support 254. Although IO requests 112 enter the IO stack 140 from the top and propagate down (from the perspective of FIG. 2), the components of the IO stack 140 are described herein from the bottom to the top to promote ease of understanding.

At the back end 144, the hard disk drive/electronic flash drive support 254 includes drivers that perform the actual reading from and writing to the magnetic disk drives, electronic flash drives, etc., in the storage 180. The RAID manager 252 arranges the storage media into RAID groups and provides access to the RAID groups using RAID protocols. The host side adapter 250 provides an interface to the front end 142, for implementations in which the front end 142 and back end 144 run on different SPs. When the front end 142 and back end 144 are co-located on the same SP, as they are in FIG. 1, the host side adapter 250 may be omitted or disabled.

Continuing to the front end 142, the basic volume interface 236 provides an interface to the back end 144 for instances in which the front end 142 and back end 144 are run on different hardware. The basic volume interface 236 may be disabled in the arrangement shown in FIG. 1.

The storage pool 232 organizes elements of the storage 180 in the form of slices. A "slice" is an increment of physical storage space, such as 256 MB or 1 GB in size, which is derived from the storage 180. In an example, each slice is derived from storage media of a single storage tier, e.g., to produce Tier 1 slices, Tier 2 slices, Tier 3 slices, etc. The pool 232 may allocate slices to lower-deck file systems 230 to support the storage of data objects. The pool 232 may also deallocate slices from lower-deck file systems 230 if the storage provided by the slices is no longer required. In an example, the storage pool 232 creates slices by accessing RAID groups formed by the RAID manager 252, dividing the RAID groups into FLUs (Flare LUNs, i.e., internal LUNs), and further dividing the FLU's into slices.

The lower-deck file systems 230 are built upon slices managed by the storage pool 232 and represent both block-based objects and file-based objects internally in the form of files ("container files" or "object files"). The data storage system 116 may host any number of lower-deck file systems 230, and each lower-deck file system may include any number of files. In a typical arrangement, a different lower-deck file system is provided for each data object to be stored. Each lower-deck file system includes one file that stores the data object itself and, in some instances, other files that store snaps of the file that stores the data object. Some implementations allow for storing additional files. Each of the lower-deck file systems 230 has an inode table. The inode table provides a different inode for each file stored in the respective lower-deck file system. Each inode stores properties of a respective file, such as its ownership and the block locations at which the file's data are stored.

In some examples, the lower-deck file systems 230 include the above-described tiering manager 152. However, the tiering manager 152 may alternatively be provided in the pool 232 or anywhere in the IO stack 140. Different functions of the tiering manager 152 may be implemented at different layers of the IO stack 140.

The volume-file mapping 228 maps each file representing a data object to a respective internal volume. Higher levels of the IO stack 140 can then access the internal volume using block-based semantics. The volume-file mapping can be achieved in a variety of ways. According to one example, a file representing a data object is regarded as a range of blocks (e.g., 8K allocation units), and the range of blocks can be expressed as a corresponding range of logical offsets into the file. Because volumes are accessed based on starting location (logical unit number) and logical offset into the volume, the volume-file mapping 228 can establish a one-to-one correspondence between offsets into the file and offsets into the corresponding internal volume, thereby providing the requisite mapping needed to express the file in the form of a volume.

The replication splitter 226 sits above the volume-file mapping 228 in implementations that support continuous replication. The replication splitter 226 is configurable by the replication manager 162 on a per-data-object basis to intercept IO requests designating data writes and to replicate (e.g., mirror) the data specified to be written according to data-object-specific settings. Depending on the data object to which the IO request is directed and the replication settings defined for that data object, the replication splitter 226 may intercept the IO request, forward the request to the replication appliance 160, and hold the request until the replication splitter 226 receives an acknowledgement back from the replication appliance 160. Once the acknowledgement is received, the replication splitter 226 may allow the IO request to continue propagating down the IO stack 140. It should be understood, however, that the replication manager 162 can configure the replications splitter 226 in a variety of ways, for responding to different types of IO requests.

The object-volume mapping layer 224 maps internal volumes to respective data objects accessible to hosts, such as LUNs, host file systems, and VVols. For LUNs, object-volume mapping may involve simply a remapping from a format compatible with the internal volume to a format compatible with the LUN. In some examples, no remapping is needed. For host file systems, object-volume mapping may be accomplished in part by leveraging from the fact that file systems are customarily built upon volumes, such that an underlying volume is part of the structure of any host file system. Host file systems, also called "upper-deck file systems" herein, are thus built upon the internal volumes presented by the volume-file mapping 228 to provide hosts with access to files and directories. Mapping of VVols can be achieved in similar ways. For block-based VVols, the object-volume mapping layer 224 may perform mapping substantially as it does for LUNs. For file-based vVOLs, the object-volume mapping layer 224 may perform mapping by converting host-specified offsets into VVol files to corresponding offsets into internal volumes.

The protocol end points 220 expose the underlying data objects to hosts in accordance with respective protocols for accessing the data objects. Thus, the protocol end points 220 may expose block-based objects (e.g., LUNs and block-based VVols) using Fiber Channel or iSCSI and may expose file-based objects (e.g., host file systems and file-based VVols) using NFS, CIFS, or SMB 3.0, for example.

In some examples, the IO stack 140 implements different functions of the tiering manager 152 at different levels. For example, when an IO request 112 specifying data to be written to a logical extent of the object-file 150 arrives at or near the top of the IO stack 140, one function of the tiering manager 152 may generate a portion of tiering metadata 154 for the specified logical extent. The IO stack 140 may provide the portion of tiering metadata in the form of a tag 210. The function may append the tag 210 to the IO request 112, to produce a tagged IO request 112*a*, which continues to propagate down the IO stack 140. When the tagged IO request 112*a* reaches a lower level of the IO stack 140, such as the lower-deck file systems 230 and/or the pool 232, another function of the tiering manager 152 reads the tag 210 and proceeds to perform storage tiering on one or more slices that provide the storage tiering designated by the tag 210. If the IO stack 140 has not already allocated all the blocks needed to satisfy the IO request 112, the IO stack 140 allocates new blocks from slices providing the designated storage tiering and proceeds to store the specified data in the newly allocated blocks.

When the data storage system 116 is arranged to perform continuous replication, the replication manager 162 (FIG. 1) may configure the replication splitter 226 to mirror, to a destination data storage system, IO requests that designate writes to logical extents of the object file 150. In some examples, the replication splitter 226 is configured to mirror tagged IO requests 112*a* and to convey tiering metadata 154 to the destination via the tags 210. In other examples, the replication splitter 226 is configured to mirror untagged IO requests 112, with tiering metadata 154 conveyed by other means. When conveying tiering metadata 154 via tags 210, the replication splitter 226 may intercept a tagged IO request 112*a* and send it to the local replication appliance 160 (FIG. 1). The local replication appliance 160 then sends the tagged IO request 112*a* to a remote replication appliance at the destination. The remote destination appliance destages the tagged IO request 112*a* to the destination data storage system, which may process the tagged IO request 112*a* in a manner similar to that done by the data storage system 116. For example, a tiering manager 152 running in the destination reads the tag 210 and applies the tag 210 when allocating storage at the destination to accommodate the tagged IO request 112*a*. In some examples, the replication splitter 226 waits to receive an acknowledgment from the local replication appliance 160 before allowing the tagged IO request 112*a* to continue down the IO stack 140 at the source.

Figure 3:
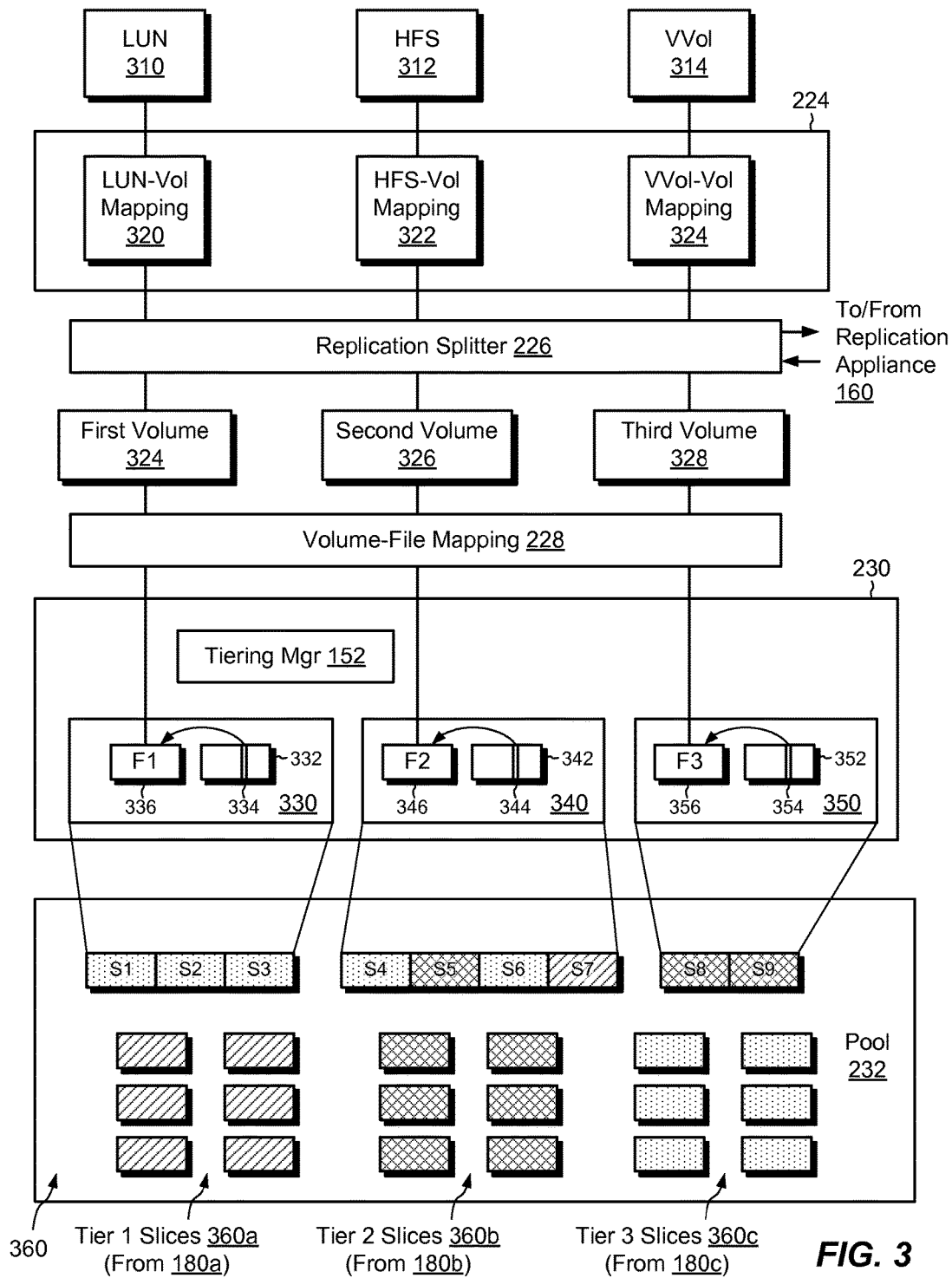
FIG. 3 is a block diagram showing example features of the IO stack of FIG. 2 in further detail.

FIG. 3 shows portions of the front end 142 in additional detail. Here, data objects include a LUN 310, an HFS (host file system) 312, and a VVol 314. The object-volume mapping 224 includes a LUN-to-Volume mapping 320, an HFS-to-Volume mapping 322, and a VVol-to-Volume mapping 324. Using the approach described above, the LUN-to-Volume mapping 320 maps the LUN 310 to a first volume 324, the HFS-to-Volume mapping 322 maps the HFS 312 to a second volume 326, and the Vvol-to-Volume mapping 324 maps the VVol 314 to a third volume 328. The replication splitter 226 may intercept IOs in accordance with settings established by the replication manager 162 (as described above). The Volume-to-File mapping 228 maps the first, second, and third internal volumes 324, 326, and 328 to respective files 336 (F1), 346 (F2), and 356 (F3) in respective lower-deck files systems 330, 340, and 350. Through the various mappings, any set of blocks of the LUN 310 specified in an IO request 112 is mapped to a corresponding set of blocks within the first volume 324 and within the first file 336. Similarly, any file or directory of the HFS 312 specified in an IO request 112 is mapped to a corresponding set of blocks within the second volume 326 and within the second file 346. Likewise, any portion of the VVol 314 specified in an IO request 112 is mapped to a corresponding set of blocks within the third volume 328 and within the third file 356. It should be understood that any of the files F1, F2, or F3 may provide the object-file 150 of FIG. 1.

The lower-deck file systems 330, 340, and 350 each include a respective inode table, 332, 342, and 352. Inode 334, 344, and 354 provide file-specific information about the first file 336, the second file, 346, and the third file 356, respectively. The information stored in each inode includes location information (e.g., physical block locations) where data of the respective file are stored.

Although a single file is shown for each of the lower-deck file systems 330, 340, and 350, it is understood that each of the lower-deck file systems 330, 340, and 350 may include any number of files, with each having its own entry in the respective inode table. In one example, each lower-deck file system stores not only the file F1, F2, or F3, but also snaps of those files, and therefore snaps of the data objects realized by the files.

As shown, the storage pool 232 provisions slices 360 to the files F1, F2, and F3. The slices 360 include Tier 1 slices 360*a*, e.g., derived from RAID groups composed of high-speed flash drives, Tier 2 slices 360*b*, e.g., derived from RAID groups composed of slower flash drives, and Tier 3 slices 360*c*, e.g., derived from RAID groups composed of magnetic disk drives. In the example shown, slices S1 through S3 are all Tier 3 slices and store the data of file F1. Slices S8 through S9 are all Tier 2 slices and store the data of file F3. Slices S4 through S7 are a combination of slices from Tier 1, Tier 2, and Tier 3 and store the data of file F2. Thus, the LUN 310 is backed entirely by Tier 3 slices, the VVol 314 is backed entirely by Tier 2 slices, and the HFS 312 is backed by a combination of slices of different tiers.

Because the files F1, F2, and F3 each store entire data objects, including their metadata, the data stored in these files may include both metadata and file data of the data objects they realize. For example, file F2 stores an entire host file system, including its inodes, indirect blocks, per-block metadata, and so forth, as well as its file data. Both data and metadata of the host file system 312 are stored in logical extents of the file F2.

Assume now that the object-file 150 is provided by the file F2. In this example, the tiering manager 152 may operate to place metadata of the host file system 312 on a higher storage tier than it uses to place file data. For example, the tiering manager 152 may generate portions of tiering metadata 154 prescribing Tier 1 storage for inodes, indirect blocks, and other metadata structures of the host file system 312. The tiering manager 152 may also generate portions of tiering metadata 154 for file data of the host file system 312, which prescribe Tier 2 storage and Tier 3 storage. The tiering manager 152 may then place the metadata and file data of the host file system 312 in accordance with the respective portions of tiering metadata. During replication, any tiering metadata 154 used for placing metadata and file data in the data storage system 116 may be sent to the destination data storage system, to be used in performing storage tiering there.

Although storage of metadata structures of the lower-deck file systems 230 is not shown in FIG. 3, it is understood that storage tiering may also be applied to lower-deck metadata. For example, the tiering manager 152 may apply storage tiering to inodes, indirect blocks, per-block metadata, and other metadata structures of the lower-deck file system 230, by generating tiering metadata that pertains to these structures and applying this tiering metadata when allocating storage to support them. In some examples, the data storage system 116 sends this tiering metadata to the destination data storage system, to ensure that any lower-deck metadata structures built to support replicas on the destination meet the same quality of service as do the corresponding structures at the source.

FIG. 4 shows an example tiering manager 152 in additional detail. The tiering manager 152 includes the tiering metadata 154 and the placement manager 156. The tiering metadata 154 is seen to include QoS (Quality of Service) metadata 410, temperature metadata 420, and policy metadata 430.

The QoS metadata 410 specifies particular storage tiers on which to place logical extents of the object-file 150. For instance, the QoS metadata 410 may specify Tier 1 storage 180a for logical extents containing metadata. Similarly, the QoS metadata 410 may specify Tier 3 storage 180c for logical extents containing file data. The tiering manager 152 may generate the tiering metadata 410 automatically, e.g., by distinguishing file data from metadata and/or by distinguishing one type of file data or metadata from another. In some examples, QoS metadata 410 may be based on user input. For instance, a user of the data storage system 116 may specify particular storage tiers for particular types of data (or metadata), and the tiering manager 152 may generate the QoS metadata 410 for particular logical extents based on the user input.

The temperature metadata 420 provides data temperature information for logical extents of the object-file 150. In an example, the data temperature metadata 420 for a logical extent provides a moving average of input and/or output activity directed to that logical extent over time. Temperature metadata 420 is thus variable based on data access patterns experienced by the data storage system 116. In an example, the data storage system 116 monitors input/output activity of logical extents of the object-file 150 over time, computes data temperature for each logical extent, and regularly updates the temperature metadata 420 to reflect recent values.

The policy metadata 430 provides information for applying the QoS metadata 210 and the temperature metadata 220 when the QoS metadata 210 and temperature metadata 220 do not prescribe the same storage tier. Thus, for example, the policy metadata 430 may be used to resolve conflicts when the QoS metadata 210 indicates a first storage tier and the temperature metadata 220 indicates a second storage tier. The policy metadata 230 may indicate that the QoS metadata 210 takes precedence over the temperature metadata 220, or vice-versa.

FIG. 4 further shows example details of the placement manager 156. Here, it is seen that the placement manager 156 includes a QoS manager 412, an auto-tiering manager 422, and a policy 432. The QoS manager 412 receives the QoS metadata 410 and provides a QoS output 412. The QoS output 412 prescribes a storage tier on which to place a logical extent based on the QoS metadata 410 for that logical extent.

The auto-tiering manager 422 receives the temperature metadata 420 and generates an auto-tiering output 424. The auto-tiering output 424 prescribes a storage tier on which to place a logical extent based on the temperature metadata 420 for that logical extent. In some examples, the auto-tiering manager 422 receives additional information (not shown), which it uses in generating the auto-tiering output 424, such as free available storage space on each storage tier.

The policy 432 receives the policy metadata 430, the QoS output 414, and the auto-tiering output 422, and generates a tiering output 434, which identifies a storage tier on which to place a logical extent in accordance with the policy 432. For example, if the policy metadata 430 specifies that QoS metadata 410 takes precedence over temperature metadata 420 for a logical extent, then the policy 432 provides a tiering output 434 that prescribes the QoS for that logical extent indicated in the QoS metadata 410, regardless of the temperature metadata 420.

FIG. 5A shows an example layout of the object-file 150. Here, the object-file 150 is seen to extend over a logical offset range 510, with the logical offset range extending from LO-A (nominally zero) to LO-F. The logical offset range 510 encompasses all data of the object-file 150. Each logical offset within the logical offset range 510 represents a location within the object-file 150 relative to LO-A. The offsets are "logical" because they refer to relative positions within the object-file 150 and are distinguished from "physical" offsets, which may refer to locations in the underlying file system (e.g., lower-deck file system 340—See FIG. 3). Logical offsets may also be referred to herein as logical addresses, and physical offsets may also be referred to herein as physical addresses.

In the example shown, the object-file 150 includes multiple logical extents, LE1 through LE5. Each logical extent occupies a respective logical offset range of the object-file 150. The logical offsets LO-A through LO-F mark boundaries between logical extents LE1 through LE5. Although only five logical extents are shown, it is understood that the object-file 150 may include any number of logical extents. The logical extents may be of any size and need not be uniform in size. In an example, each logical extent has a size equal to that of an integer number of blocks (e.g., 8 KB allocation units); however, this is not required.

FIG. 5B shows an example arrangement of the tiering metadata 154 in a tiering map 500. Here, it is seen that the tiering map 500 includes portions of tiering metadata 154(1) through 154(5), i.e., one portion of tiering metadata for each of the logical extents LE1 through LE5. Each portion of tiering metadata may include, for the respective logical extent, QoS metadata 410, data temperature metadata 420, and policy metadata 430. In this example, the policy metadata 430 indicates whether QoS metadata 410 takes precedence ("Wins") over temperature metadata 420, or vice-versa. It should be understood that not all of the indicated types of metadata need be present for each logical extent (see for example portion 154(4), which is missing QoS metadata). Further, additional types of metadata may be provided besides those shown.

Figure 6:
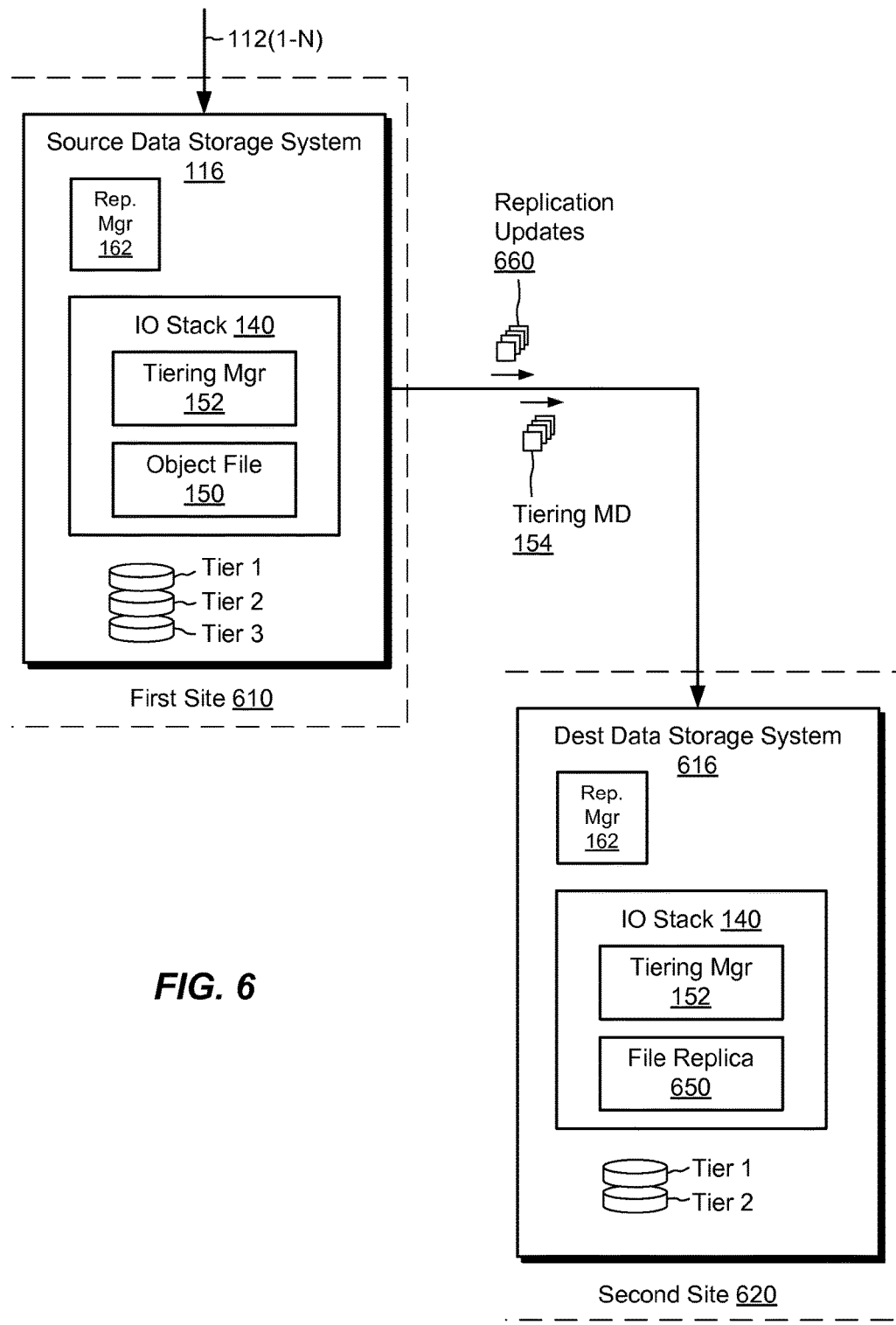
FIG. 6 is a block diagram showing an example arrangement for managing storage tiering of a file when replicating the file from a source data storage system to a destination data storage system.

FIG. 6 shows an example arrangement for performing replication between the source data storage system 116 (source) at a first site 610 and a destination data storage system 616 (destination) at a second site 620. The first site 610 and the second site 620 may be geographically separate, e.g., in a metro-cluster; however, this is not required. Here, the destination 616 performs storage tiering on a replica 650 using the same tiering metadata 154 that the source 116 uses to perform storage tiering on the object-file 150. The destination 616 may have a similar configuration to that of the source 116, although it need not be identical. The example shown in FIG. 6 is intended to be generic to all types of replication, including snapshot-shipping and continuous replication, as well as other types of replication.

In example operation, the replication managers 162 (FIG. 1) on the source 116 and destination 616 establish a replication relationship to maintain the replica 650 at the destination 616 current, or approximately current, with the object-file 150 at the source 116. As IO requests arrive at the source 116 to effect changes in the object-file 150 at specified logical extents, the source 116 updates the object-file 150 at the specified logical extents, applying the tiering metadata 154 for any allocating writes to the object-file 150.

As changes in the object-file 150 are made or accumulate at the source 116 in response to the IO requests, the source 116 sends replication updates 660 to the destination 616 to effect corresponding changes in the replica 650. The replication updates 660 identify the logical extents of the object-file 150 that are being changed, or that have recently been changed, and include the changed file data. The destination 616 receives the updates 660.

The source 116 also sends the tiering metadata 154 to the destination 616, to enable the destination 616 to apply the tiering metadata 154 in placing the file data specified in the replication updates 660. The source 116 may send the tiering metadata 154 prior to sending the replication updates 660 or contemporaneously therewith.

In some examples, the source 116 sends portions (e.g., 154(1), 154(2), etc., see FIG. 5B) of tiering metadata in the replication updates 660 themselves, e.g., as part of metadata payloads. In such examples, the portions of tiering metadata 154 sent from source to destination in each replication update 660 need include only the portions of tiering metadata for the logical extents that the replication update 660 is changing. In further examples, the portions of tiering metadata sent from source to destination need include only those portions that require new allocations of storage space to accommodate the data to be written, as previously-placed logical extents have already been assigned to storage tiers.

In other examples, the source 116 may send the tiering metadata 154 in a tiering map, such as the tiering map 500 shown in FIG. 5B. For example, the tiering map 500 may include portions (e.g., 154(1), 154(2), etc.) of tiering metadata for all logical extents of the object-file 150, or for any subset thereof. In some examples, the source 116 sends an initial version of the tiering map 500 to the destination 616 prior to sending the replication updates 660. The tiering map 500 may be refreshed thereafter over time, with refreshed map content sent from source to destination either in band with replication updates 660 (e.g., as part of metadata payloads) or out of band.

Upon receiving each of the replication updates 660, the destination 616 identifies the logical extent (or extents) to which the replication update is directed and places each such logical extent in a storage tier in accordance with the tiering metadata 154 received from the source 116. In an example, the tiering manager 152 on the destination 616 operates its own placement manager 156. For each logical extent received in the replication update, the placement manager 156 selects a storage tier from among the storage tiers available at the destination 616. Here, the destination 616 supports only two storage tiers (Tier 1 and Tier 2), whereas the source 116 supports three. The placement manager 156 at the destination 616 applies the portion of tiering metadata, received from the source 116 for that storage extent, and makes an independent selection of a storage tier at the destination 616. The placement manager 156 at the destination 616 then directs storage of the file data provided in the logical extent in the selected storage tier.

In selecting a storage tier, the placement manager 156 at the destination 616 may perform its own auto-tiering operation 422, but using the temperature metadata 420 generated at the source 116. Likewise, the placement manager 156 may perform its own QoS management operation 412 and operate its own policy 432, but based on the QoS metadata 420 and policy metadata 430 received from the source 116.

Given this arrangement, it is evident that the destination 616 places logical extents in the replica 650 based on the same tiering metadata 154 that the source 116 uses to place the same logical extents in the object-file 150. However, the selection of storage tiers at the destination 616 proceeds independently from the selection at the source 616. As the storage tiers available at the destination 616 may differ from those available at the source 116, logical extents may be placed on different storage tiers at the destination 616 from the ones on which the same logical extents are placed at the source 116.

Of course, the destination 616 may be configured to generate locally its own tiering metadata for the logical extents being placed in the replica 650. However, this locally-generated tiering metadata is not used in placing the logical extents arriving in the replication updates 660. Rather, it is the tiering metadata 154 received from the source 116 that the destination 616 uses to place the logical extents received in the replication updates 660.

Figure 7:
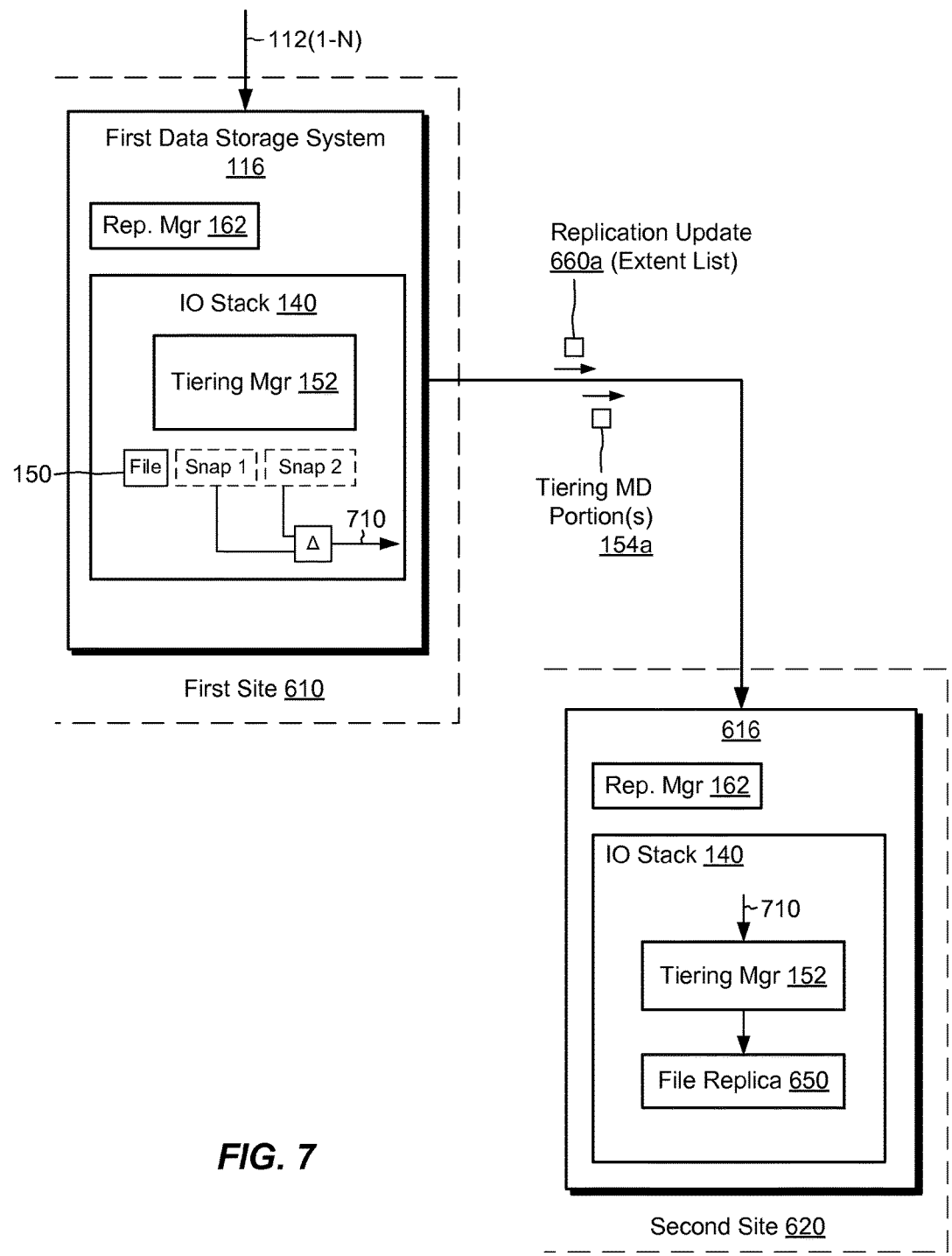
FIG. 7 is a block diagram showing an example arrangement for managing storage tiering of a file when replicating the file from a source data storage system to a destination data storage system using snapshot-shipping replication.

FIG. 7 shows a more particular example of the arrangement of FIG. 6, in which replication of the object-file 150 to the replica 650 is implemented using snapshot-shipping replication. Here, replication proceeds by the source 116 taking snaps of the object-file 150 at different times, identifying differences between pairs of consecutive snaps, and sending the differences to the destination 616, where the destination incorporates the differences into the replica 650.

For example, the source 116 takes a first snap (Snap 1) of the object-file 150 at time T1 and takes a second snap (Snap 2) of the object-file 150 at time T2, which is later than T1. The source computes a difference 710 between Snap 1 and Snap 2 and sends the difference 710 in a replication update 660a to the destination 616. In an example, the replication update 660a takes the form of an extent list, i.e., a list of logical extents of the object-file 150 that have changed between T1 and T2. For instance, the extent list may include a list of logical blocks, i.e., fixed-sized increments of file data at specified logical offsets into the object-file 150, along with the corresponding file data. The source 116 also sends tiering metadata 154 to the destination 616, e.g., in any of the ways described in connection with FIG. 6. In some examples, the source 116 sends portions 154a of tiering metadata along with the extent list, e.g., in a single transmission. The portions 154a need include only those portions of tiering metadata that correspond to logical extents for which the destination 616 must allocate new storage space. In an example, the source 116 is able to identify these logical extents because they are the same ones that require new allocations at the source. The destination 616, upon receiving the extent list and the portions 154a of tiering metadata, places the logical extents specified in the extent list in accordance with the portions 154a of tiering metadata, i.e., in the manner described in connection with FIG. 6 above. Although this example provides that the tiering metadata 154 be send along with the extent list in a single transmission, it should be understood the tiering metadata 154 may alternatively be sent using a tiering map 500 or using any other suitable means. The above-described snapshot-shipping replication and tiering operations can be repeated over time, as needed to maintain the replica 650 in a content-consistent state, or in a nearly content-consistent state, with the object-file 150.

Figure 8:
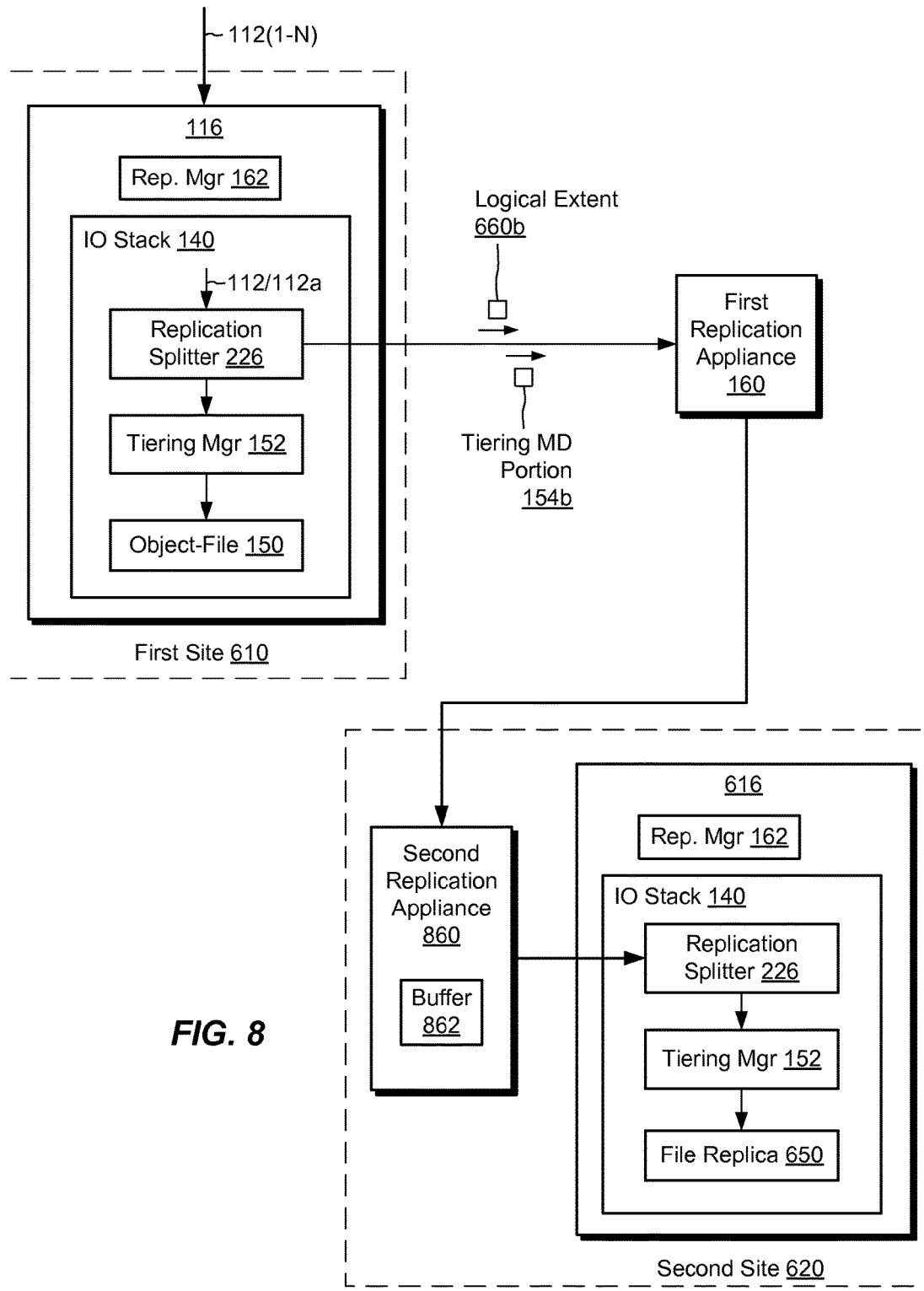
FIG. 8 is a block diagram showing an example arrangement for managing storage tiering of a file when replicating the file from a source data storage system to a destination data storage system using continuous replication.

FIG. 8 shows another particular example of the arrangement of FIG. 6, in which replication of the object-file 150 to the replica 650 is implemented using continuous replication. Here, a replication splitter 226 in the IO stack 140 of the source 116 (see FIGS. 2 and 3) intercepts an IO request 112a directed to the internal volume representation of the object-file 150. The intercepted IO request specifies a logical extent of data to be written to the object-file 150 at a specified logical offset range. The splitter 226 sends the logical extent in a replication update 660b to the first replication appliance 160 (FIG. 1). The first replication appliance 160 forwards the replication update 660b to a second replication appliance 860. The second replication appliance 862 persists the replication update 660b in a buffer 862 and acknowledges safe receipt back to the first replication appliance 160. The first replication appliance 160 then acknowledges back to the replication splitter 226 on the source 116. At some time relative to sending the replication update 660b to the first replication appliance 160, the source 116 also sends tiering metadata 154b to the destination 616. The tiering metadata may be sent using a map 500, as described above, or using any other suitable means. In some examples, the source 116 sends tiering metadata to the destination 616 in portions along with respective logical extents. For instance, the source 116 may send a portion 154b of tiering metadata specific to the logical extent being replicated as part of a metadata payload of the replication update 660b.

With the data specified in the IO request safely persisted in the buffer 862 at the second site 620, the source 116 proceeds to select a storage tier for placing the logical extent specified in the IO request 112a and to place the logical extent in accordance with the tiering metadata 154. Meanwhile, at the destination 616, the buffer 862 destages the persisted storage extent to the IO stack 140 at the destination 616. The destination 616 selects a storage tier, using the portion 154b of tiering metadata, and places the logical extent in the selected storage tier.

The continuous replication and tiering operations can be repeated for replicating any number of storage extents over time, as needed to maintain the replica 650 in a content-consistent state, or in a nearly content-consistent state, with the object-file 150.

Figure 9:
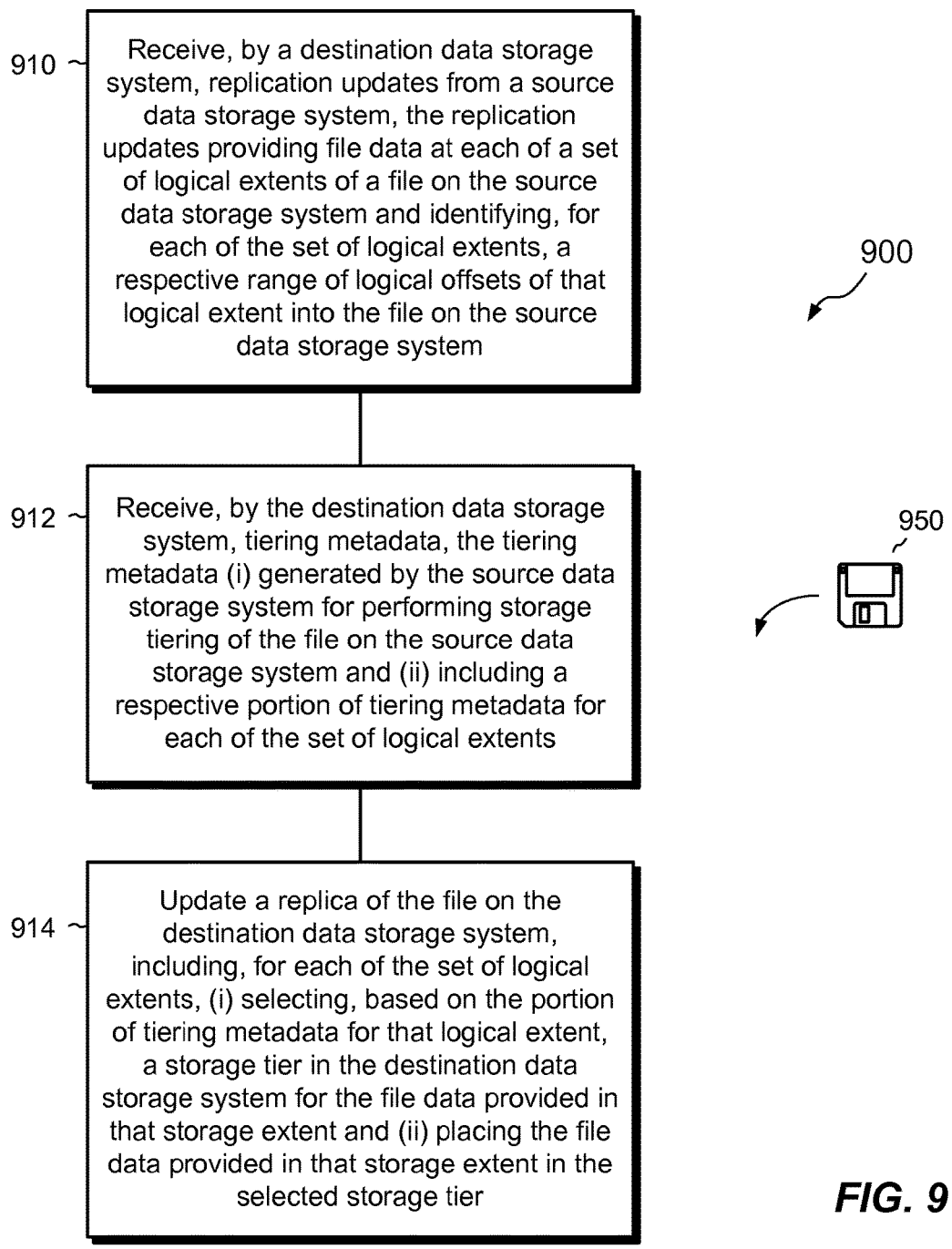
FIG. 9 is a block diagram showing an example process for performing storage tiering in a destination data storage system having multiple storage tiers configured to store replicated data received from a source data storage system.

FIG. 9 shows an example process 900 for performing storage tiering in a destination data storage system 616. The process 900 may be performed by the software constructs, described in connection with FIGS. 1-3 and 6-8, which reside in the memory 130 of the destination data storage system 616 and are run by the set of processing units 124. The various acts of the process 900 may be ordered in any suitable way. Accordingly, embodiments may be constructed in which acts are performed in orders different from those illustrated, which may include performing some acts simultaneously, even though the acts are shown as sequential in the illustrated embodiments.

At 910, the destination data storage system receives replication updates from the source data storage system. The replication updates provide file data at each of a set of logical extents of a file on the source data storage system and identify, for each of the set of logical extents, a respective range of logical offsets of that logical extent into the file on the source data storage system. For example, the destination data storage system 616 receives replication updates, e.g., 660, 660a, or 660b, from the source data storage system 116. The replication updates provide file data (e.g., data of the object-file 150) at one or more logical extents, e.g., at any of LE1 through LE5 (FIG. 5A) of the object-file 150, with each logical extent identified by a range of logical offsets (e.g., any of LO-A through LO-F) of the object-file 150.

At 912, the destination data storage system receives tiering metadata. The tiering metadata is (i) generated by the source data storage system for performing storage tiering of the file on the source data storage system and (ii) includes a respective portion of tiering metadata for each of the set of logical extents. For example, the destination data storage system 616 receives tiering metadata 154, 154a, or 154b from the source data storage system 116. The tiering metadata is generated by the source data storage system 116 for performing storage tiering on the source and includes portions, e.g., 154(1), 154(2), and so on.

At 914, a replica of the file on the destination data storage system is updated. Updating the replica includes, for each of the set of logical extents, (i) selecting, based on the portion of tiering metadata for that logical extent, a storage tier in the destination data storage system for the file data provided in that storage extent and (ii) placing the file data provided in that storage extent in the selected storage tier. For example, a placement manager 156 on the destination data storage system 116 selects a storage tier for arriving logical extents based on portions of tiering metadata generated for those logical extents on the source 116. The placement manager 156 further directs placement of the file data on the selected storage tiers.

An improved technique has been described for replicating a file 150 from a source data storage system 116 to a destination data storage system 616. The technique includes receiving, by the destination 616, (i) file data for multiple logical extents of the file 150 and (ii) respective tiering metadata 154 for those logical extents. The destination 616 selects, based on the tiering metadata 154, one or more storage tiers available on the destination 616. The destination 616 updates a local replica 650 of the file by placing the logical extents on the selected tier or tiers. Performing storage tiering on the destination 616, based on tiering metadata 154 generated by the source 116, promotes efficiency and enables the possibility that the destination 616 may place logical extents on different storage tiers from those on which the same extents are placed on the source 116, such as to reflect differences in configuration between source and destination.

Having described certain embodiments, numerous alternative embodiments or variations can be made. For example, although replication and storage tiering have been described with reference to a source and a single destination, replication may also be conducted between the source and multiple destinations. According to this variant, each destination data storage system would receive both replication updates and tiering metadata generated by the source and would perform independent storage tiering based upon the tiering metadata from the source.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 950 in FIG. 9). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of performing storage tiering in a destination data storage system, the destination data storage system having multiple storage tiers configured to store replicated data received from a source data storage system, the method comprising:
receiving, by the destination data storage system, replication updates from the source data storage system, the replication updates providing file data at each of a set of logical extents of a file on the source data storage system and identifying, for each of the set of logical extents, a respective range of logical offsets of that logical extent into the file on the source data storage system;
receiving, by the destination data storage system, tiering metadata, the tiering metadata (i) generated by the source data storage system for performing storage tiering of the file on the source data storage system and (ii) including a respective portion of tiering metadata for each of the set of logical extents; and
updating a replica of the file on the destination data storage system, including, for each of the set of logical extents, (i) selecting, based on the portion of tiering metadata for that logical extent, a storage tier in the destination data storage system for the file data provided in that logical extent and (ii) placing the file data provided in that logical extent in the selected storage tier,
wherein the portion of tiering metadata for one of the set of logical extents includes data temperature metadata specific to that logical extent, the data temperature metadata for that logical extent indicating a moving average of input/output activity directed to that logical extent on the source data storage system over time,
wherein selecting a storage tier for that logical extent includes performing an auto-tiering operation on that logical extent, the auto-tiering operation generating an auto-tiering output that prescribes, based on the temperature metadata for that logical extent, a storage tier on which to place the file data of that logical extent in the destination data storage system,
wherein receiving the replication updates includes receiving a continuous replication update, the continuous replication update (i) identifying one of the set of logical extents and providing, for the identified logical extent, (a) a logical offset range of the identified logical extent within the file and (b) file data for the logical extent in the first data storage system, and
wherein receiving the continuous replication update includes concurrently receiving the portion of tiering metadata for the identified logical extent provided in the continuous replication update.

2. The method of claim 1,
wherein the portion of tiering metadata for the logical extent further includes QoS metadata for that logical extent, the QoS metadata for that logical extent indicating a storage tier on which a source QoS management operation on the source data storage system prescribes placement of the file data of that logical extent on the source data storage system, and
wherein selecting a storage tier for that logical extent includes performing a destination QoS-management operation on that logical extent, the destination QoS-management operation generating a QoS output that prescribes, based on the QoS metadata for that logical extent, a storage tier on which to place the file data of that logical extent on the destination data storage system.

3. The method of claim 2, wherein the portion of tiering metadata for the logical extent further includes tiering policy metadata for that logical extent, the tiering policy metadata for that logical extent prescribing a procedure for placing the file data of that logical extent when the auto-tiering output prescribes a first storage tier and the QoS output prescribes a second storage tier different from the first storage tier.

4. The method of claim 1, wherein, when placing the file data for each of the set of logical extents on one of the storage tiers of the destination data storage system, the destination data storage system does not temporarily place the file data on a storage tier without regard to the tiering metadata, but rather places the file data directly on a storage tier selected in accordance with the respective portion of tiering metadata received for that logical extent.

5. The method of claim 4, wherein receiving the tiering metadata includes receiving a set of maps that relate multiple logical extents of the file to respective QoS values and to respective data temperature values.

6. A destination data storage system, comprising control circuitry that includes a set of processing units coupled to memory, the control circuitry constructed and arranged to:
receive, by the destination data storage system, a set of replication updates from the source data storage system, the replication updates providing file data at each of a set of logical extents of a file on the source data storage system and identifying, for each of the set of logical extents, a respective range of logical offsets of that logical extent into the file on the source data storage system;
receive, by the destination data storage system, tiering metadata, the tiering metadata (i) generated by the source data storage system for performing storage tiering of the file on the source data storage system and (ii) including a respective portion of tiering metadata for each of the set of logical extents; and
update a replica of the file on the destination data storage system, including, for each of the set of logical extents, (i) selecting, based on the portion of tiering metadata for that logical extent, a storage tier in the destination data storage system for the file data provided in that logical extent and (ii) placing the file data provided in that logical extent in the selected storage tier, wherein the destination data storage system is configured to receive, concurrently with each replication update, a respective portion of tiering metadata for a logical extent identified in that replication update.

7. The destination data storage system of claim 6, wherein the portion of tiering metadata for one of the set of logical extents includes data temperature metadata specific to that logical extent, the data temperature metadata for that logical extent indicating a moving average of input/output activity directed to that logical extent on the source data storage system over time, and wherein, when constructed and arranged to select a storage tier for that logical extent, the control circuitry is further constructed and arranged to perform an auto-tiering operation on that logical extent, the auto-tiering operation generating an auto-tiering output that prescribes, based on the temperature metadata for that logical extent, a storage tier on which to place the file data of that logical extent in the destination data storage system.

8. The destination data storage system of claim 7, wherein the portion of tiering metadata for the logical extent further includes QoS metadata for that logical extent, the QoS metadata for that logical extent indicating a storage tier on which a source QoS management operation on the source data storage system prescribes placement of the file data of that logical extent on the source data storage system, and wherein, when constructed and arranged to select a storage tier for that logical extent, the control circuitry is further constructed and arranged to perform a destination QoS-management operation on that logical extent, the destination QoS-management operation generating a QoS output that prescribes, based on the QoS metadata for that logical extent, a storage tier on which to place the file data of that logical extent on the destination data storage system.

9. The destination data storage system of claim 8, wherein the portion of tiering metadata for the logical extent further includes tiering policy metadata for that logical extent, the tiering policy metadata for that logical extent prescribing a procedure for placing the file data of that logical extent when the auto-tiering output prescribes a first storage tier and the QoS output prescribes a second storage tier different from the first storage tier.

10. The destination data storage system of claim 9, wherein, when constructed and arranged to receive the tiering metadata, the control circuitry is further constructed and arranged to receive a set of maps that relate multiple logical extents of the file to respective data QoS values and to respective temperature values.

11. A computer-program product including a set of non-transitory, computer-readable media having instructions which, when executed by control circuitry of a destination data storage system, cause the control circuitry to perform a method for performing storage tiering in the destination data storage system, the method comprising:

receiving, by the destination data storage system, tiering metadata, the tiering metadata generated by a source data storage system for performing storage tiering of a file on the source data storage system;

receiving, by the destination data storage system, replication updates from the source data storage system, the replication updates providing file data at each of a set of logical extents of a file on the source data storage system and identifying, for each of the set of logical extents, a respective range of logical offsets of that logical extent into the file on the source data storage system; and updating a replica of the file on the destination data storage system, including placing each of the set of logical extents on one of multiple storage tiers of the destination data storage system in accordance with the tiering metadata, wherein the tiering metadata includes a respective portion of tiering metadata for each of the set of logical extents, and wherein placing each logical extent on a storage tier is performed in accordance with the respective portion of tiering metadata for that logical extent, wherein, when receiving each replication update, the destination data storage system concurrently receives a respective portion of tiering metadata for a logical extent identified in that replication update.

12. The computer-program product of claim 11, wherein the portion of tiering metadata for one of the set of logical extents includes data temperature metadata specific to that logical extent, the data temperature metadata for that logical extent indicating a moving average of input/output activity directed to that logical extent on the source data storage system over time, and wherein selecting a storage tier for that logical extent includes performing an auto-tiering operation on that logical extent, the auto-tiering operation generating an auto-tiering output that prescribes, based on the temperature metadata for that logical extent, a storage tier on which to place the file data of that logical extent in the destination data storage system.

13. The computer-program product of claim 12, wherein the portion of tiering metadata for the logical extent further includes QoS metadata for that logical extent, the QoS metadata for that logical extent indicating a storage tier on which a source QoS management operation on the source data storage system prescribes placement of the file data of that logical extent on the source data storage system, and wherein selecting a storage tier for that logical extent includes performing a destination QoS-management operation on that logical extent, the destination QoS-management operation generating a QoS output that prescribes, based on the QoS metadata for that logical extent, a storage tier on which to place the file data of that logical extent on the destination data storage system.

14. The computer-program product of claim 13, wherein the portion of tiering metadata for the logical extent further includes tiering policy metadata for that logical extent, the tiering policy metadata for that logical extent prescribing a procedure for placing the file data of that logical extent when the auto-tiering output prescribes a first storage tier and the QoS output prescribes a second storage tier different from the first storage tier.

15. The computer-program product of claim 14, wherein, when placing the file data for each of the set of logical extents on one of the storage tiers of the destination data storage system, the destination data storage system does not temporarily place the file data on a storage tier without regard to the tiering metadata, but rather places the file data directly on a storage tier selected in accordance with the respective portion of tiering metadata received for that logical extent.

16. The computer program product of claim 12, wherein receiving the replication updates includes receiving a snapshot-shipping update, the snapshot-shipping update providing a list of logical extents of the file, the list of logical extents (i) providing a subset of the set of logical extents, and (ii) identifying, for each listed logical extent, (a) a logical offset range of that listed logical extent within the file and (b) file data for that listed logical extent in the first data storage system.

17. The computer program product of claim 16, wherein receiving the snapshot-shipping update includes concurrently receiving a portion of tiering metadata for each of the logical extents provided in the list of logical extents.

18. The method of claim 11, wherein each replication update is received together with a respective portion of tiering metadata in a single transmission from the source data storage system.

\* \* \* \* \*